(12) United States Patent  (10) Patent No.: US 9,126,615 B2
Mersky et al.  (45) Date of Patent: Sep. 8, 2015

(54) MOBILE DEVICE HOLDER (71) Applicant: Randy Mersky, Silver Spring, MD (US)

(72) Inventors: Randy Mersky, Silver Spring, MD (US); Larry Kiliszewski, The Woodlands, TX (US)

( * ) Notice: Subject to any disclaimer, the term of this patent is extended or adjusted under 35 U.S.C. 154(b) by 0 days.

(21) Appl. No.: 14/208,943

(22) Filed: Mar. 13, 2014

(65) Prior Publication Data

US 2014/0265185 A1   Sep. 18, 2014

Related U.S. Application Data

(60) Provisional application No. 61/782,181, filed on Mar. 14, 2013.

(51) Int. Cl.
*B62D 39/00* (2006.01)
*B62B 3/14* (2006.01)
*F16M 11/04* (2006.01)
*F16M 13/02* (2006.01)

(52) U.S. Cl.
CPC ............ *B62B 3/1428* (2013.01); *F16M 11/041* (2013.01); *F16M 13/02* (2013.01); *F16M 2200/02* (2013.01)

(58) Field of Classification Search
CPC ......... A47B 97/04; A47B 27/00; A47B 23/02
USPC ............. 280/33.992, 33.997; 248/447, 187.1, 248/460, 451, 456
See application file for complete search history.

(56) References Cited

U.S. PATENT DOCUMENTS

| | | | | |
|---|---|---|---|---|
| 1,203,659 | A * | 11/1916 | Smith | 248/456 |
| 4,093,326 | A * | 6/1978 | Ford | 248/461 |
| 5,433,415 | A * | 7/1995 | Samson et al. | 248/448 |
| 5,651,525 | A * | 7/1997 | Yang | 248/456 |
| 5,855,329 | A * | 1/1999 | Pagano | 248/451 |
| 6,206,426 | B1 * | 3/2001 | Azzato | 248/447 |
| 6,971,621 | B2 * | 12/2005 | Gaines | 248/447 |
| 7,118,083 | B2 * | 10/2006 | Liang | 248/442.2 |
| 7,118,084 | B2 * | 10/2006 | Park | 248/460 |
| 7,188,818 | B2 * | 3/2007 | Chang | 248/460 |
| 7,290,740 | B2 * | 11/2007 | Joy et al. | 248/187.1 |
| 8,079,165 | B1 * | 12/2011 | Buerchner et al. | 248/451 |
| 8,474,832 | B2 | 7/2013 | Mersky | |
| 8,668,257 | B2 * | 3/2014 | Wu | 248/446 |
| 2014/0091192 | A1 | 4/2014 | Mersky | |

* cited by examiner

*Primary Examiner* — Hau Phan
(74) *Attorney, Agent, or Firm* — Greenblum & Bernstein, P.L.C.

(57) ABSTRACT

A mobile device holder includes a holding portion, a lower shelf fixedly attached to a base of the holding portion and configured to support a mobile device, an upper shelf slidably affixed to the holding portion and slidable along a plane defined by the holding portion toward the lower shelf such that a distance between the upper shelf and lower shelf is adjustable, a pivot assembly connected to the holding portion and configured to pivot about a pivot axis, wherein the lower shelf is attached to the base of the holding portion at a fixed distance from the pivot assembly, and a mount affixed to the pivot assembly, wherein the holding portion, the upper shelf and the lower shelf are pivotable together about the pivot axis relative to the mount between an upright position and a stowed position.

20 Claims, 10 Drawing Sheets

MOBILE DEVICE HOLDER

CROSS-REFERENCE TO RELATED APPLICATIONS

The instant application claims the benefit of priority of U.S. provisional application No. 61/782,181, filed on Mar. 14, 2013, the disclosure of which is herein expressly incorporated by reference in its entirety.

BACKGROUND

1. Field of the Disclosure

The present disclosure relates to the field of mobile device holders. More particularly, the present disclosure relates to mobile device holder configured to hold mobile devices of different dimensions and orientations.

2. Background Information

Smartphones and other electronic mobile devices have become increasingly popular for managing multiple aspects of one's daily life. One such aspect is shopping. For example, shoppers have increasingly been using electronic mobile devices to manage shopping lists or to otherwise enhance the shopping experience.

Many companies are trying to engage consumers directly at the point of purchase (e.g., at a supermarket or other retail location). Through mobile GPS and opt-in programs software is being actively developed to display advertisements, provide scannable codes (in the form of, e.g., barcodes, RFID codes, QR codes and the like) and offer messages and promotions to consumers as they move through the retail location. A challenge to such engagement is that consumers often store their devices in their pockets, purses or elsewhere, thereby inhibiting consumer interaction and foreclosing to vendors marketing directed at the consumer. Additionally, the variety of sizes of mobile devices makes it difficult to have a device that works for mobile devices of different types and dimensions.

As such, a need has arisen for a system to not only hold, but to display the screen of such mobile devices to the shopper, so that the shopper can safely push a shopping cart while still being able to view the device. Two such systems are disclosed in U.S. Pat. No. 8,474,832 and U.S. patent application Ser. No. 13/630,552, the entire contents of which are expressly incorporated by reference herein.

In view of the above, a need has arisen for a combination mobile phone and tablet holder that can be attached and optionally secured to a grocery cart which has the capability to securely and removably hold a variety of items including mobile devices at different viewing angles.

SUMMARY OF THE DISCLOSURE

According to a non-limiting feature of the disclosure, provided is a mobile device holder having a holding portion, a lower shelf fixedly attached to a base of the holding portion and configured to support a mobile device, an upper shelf slidably affixed to the holding portion and slidable along a plane defined by the holding portion toward the lower shelf such that a distance between the upper shelf and lower shelf is adjustable, a pivot assembly connected to the holding portion and configured to pivot about a pivot axis, wherein the lower shelf is attached to the base of the holding portion at a fixed distance from the pivot assembly, and a mount affixed to the pivot assembly, wherein the holding portion, the upper shelf and the lower shelf are pivotable together about the pivot axis relative to the mount between an upright position and a stowed position.

Also, the holding portion and lower shelf are integrally unitarily formed. Also provided may be padding affixed to the upper shelf and the lower shelf and configured to contact the mobile device. Further provided may be a spring configured to bias the upper shelf toward the lower shelf. The spring may be a constant force tape spring.

The mount the mount may include a pair of arms, and the pivot assembly may include a rotation shaft supported between the pair of arms and coincident with the pivot axis. Also, each arm of the pair of arms includes a protruding bumper extending in a direction opposite the lower shelf in the upright position.

Additionally provided may be a flip shelf attached to the holding portion between the upper shelf and lower shelf, the flip shelf configured to pivot relative to the holding portion in a range between a holding position and a stowed position, wherein the holding portion is configured to hold the mobile device between the flip shelf and the upper shelf, in the holding position. The flip shelf includes a pair of flip shelves, each flip shelf of the pair of flip shelves attached to an opposite side of the holding portion. Alternatively, flip shelf is a single flip shelf.

Also provided may be a flip shelf lock affixed to a side of the holding portion, the flip shelf lock configured to removably hold the flip shelf in the stowed position. A flip shelf support configured to prevent pivoting of the flip shelf outside the range between the holding position and the stowed position, when the flip shelf is in the holding position may be provided. Padding may be affixed to the flip shelf and configured to contact the mobile device may also be provided. The thickness of the padding may decrease in a depth direction of the upper shelf and the lower shelf, and/or the thickness of the padding may decreases in a depth direction of the flip shelf.

Additionally provided may be a flip shelf stop configured to prevent pivoting of the flip shelf outside the range between the holding position and the stowed position when the flip shelf is in the stowed position.

A slide guide affixed to the upper shelf and configured to slide along the housing to move the upper shelf towards and away from the lower shelf may additionally be provided. A spring may be provided, wherein one end of the spring is affixed to the slide guide and another end of the spring is affixed to the holding portion such that the upper shelf is biased toward the lower shelf. The holding portion may include a front holding portion and a rear holding portion, and the slide guide may be configured to slide between the front holding portion and the rear holding portion.

Another non-limiting feature of the disclosure provides a shopping cart including a main basket, a secondary basket configured to swing upward relative to the main basket when the shopping cart is nested with another shopping cart, and a mobile device holder, the mobile device holder having a holding portion, a lower shelf fixedly attached to a base of the holding portion and configured to support a mobile device, an upper shelf slidably affixed to the holding portion and slidable along a plane defined by the holding portion toward the lower shelf such that a distance between the upper shelf and lower shelf is adjustable, a pivot assembly connected to the holding portion and configured to pivot about a pivot axis, wherein the lower shelf is attached to the base of the holding portion at a fixed distance from the pivot assembly, and a base affixed to the pivot assembly and attached to the secondary basket, wherein the holding portion, the upper shelf and the lower shelf are pivotable together about the pivot axis relative to the mount between an upright position and a stowed position.

A further non-limiting feature of the disclosure provides a mobile device holder including a holding portion, a lower shelf affixed to a base of the holding portion and configured to support a mobile device, an upper shelf slidably affixed to the holding portion and slidable along a plane defined by the holding portion toward the lower shelf such that a distance between the upper shelf and lower shelf is adjustable, a flip shelf attached to the holding portion between the upper shelf and lower shelf, the flip shelf configured to pivot relative to the holding portion in range between a holding position and a stowed position, wherein the holding portion is configured to hold the mobile device between the flip shelf and the upper shelf, in the holding position, and a mounting assembly affixed to the holding portion, wherein the lower shelf is attached to the base of the holding portion at a fixed distance from the mounting assembly.

The mounting assembly may further include a pivot assembly configured to pivot about a pivot axis, and the holding portion, the upper shelf and the lower shelf may be pivotable together about the pivot axis relative to the mount between an upright position and a stowed position.

Other exemplary embodiments and advantages of the present invention may be ascertained by reviewing the present disclosure and the accompanying drawings, and the above description should not be considered to limit the scope of the present invention.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings, and wherein.

DETAILED DESCRIPTION

In view of the foregoing, the present disclosure, through one or more of its various aspects, embodiments and/or specific features or sub-components, is thus intended to bring out one or more of the advantages as specifically noted below.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Referring now to the drawings wherein like characters represent like elements. FIGS. 1-18 show a mobile device holder 210 according to the first aspect of the present disclosure. As used herein, "mobile device" can mean any mobile device, including but not limited to a tablet computer (such as, e.g., an iPad), a smartphone (such as, e.g., a Blackberry, iPhone, Android), personal digital assistant (PDA), a global positioning satellite (GPS) device, a portable music player (such as, e.g., an iPod), an e-reader, a palmtop computer, a laptop computer, a wireless/cellular telephone, a camera, a pager, a personal trusted device, a portable video game system, and a web appliance (such as, e.g., an iPod Touch). Nor is the present invention limited to electronic devices, e.g., a notepad or coupon book may be used with the present invention.

Figure 5:
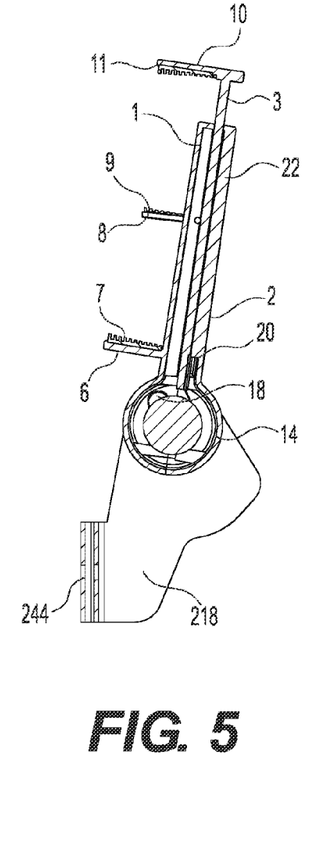
FIG. 5 shows a side sectional view of the mobile device holder taken along the lines A-A of FIG. 4.

The mobile device holder 210 includes a holding portion 212, a pivot assembly 214 and a mount 218, although in alternative embodiments, the pivot assembly may be excluded. The holding portion 212 includes a holding portion body 22 and a lower shelf 6. The lower shelf 6 may be unitarily formed with the holding portion body 22 from a single piece of material, or may be fastened to the holding portion body. According to a feature, the holding portion body 22 includes a front mounting plate 1 and a rear mounting plate 2 which are fastened together to form the holding portion. An upper shelf 10 extending in a plane generally parallel with the lower shelf 6 is provided at the top of the holding portion body 22, and a slide guide 3 depending from the upper shelf generally at a 90 degree angle is provided. As shown in FIG. 5, the slide guide 3 extends between the front mounting plate 1 and rear mounting plate 2, which allows the upper shelf 10 to slide toward and away from the lower shelf 6. It is appreciated by those skilled in the art that in alternative embodiments, only one housing plate may be provided and the slide guide 3 may be slidably affixed to a single housing plate.

According to a feature of the disclosure, the upper shelf 10 is downwardly biased towards the lower shelf 6 by a spring 14. For example, the spring 14 may be a constant force tape spring wound about pivot shaft 13, and having one end affixed to a base of the slide guide 3 by a spring holding plate 20, and having another end affixed to the holding portion. Pulling the upper shelf 10 in direction Z away from the lower shelf 6 extends the spring 14 and creates tension therein, and releasing the extended upper shelf allows the spring to pull the upper shelf toward the lower shelf in direction Z, until the slide guide 3 reaches its travel limit (when not holding a mobile device). The spring 14 provides adequate tension to securely hold a mobile device while limiting movement and shaking, while still allowing a user/shopper to easily remove their device from the mobile device holder 210.

Figure 15:
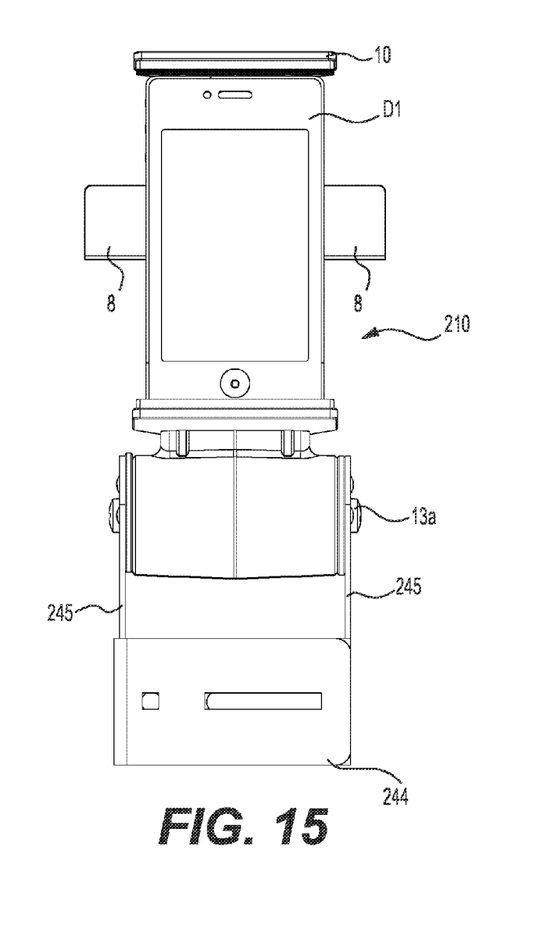
FIG. 15 shows a front elevational view of the mobile device holder holding the smartphone in a portrait position.
Figure 16:
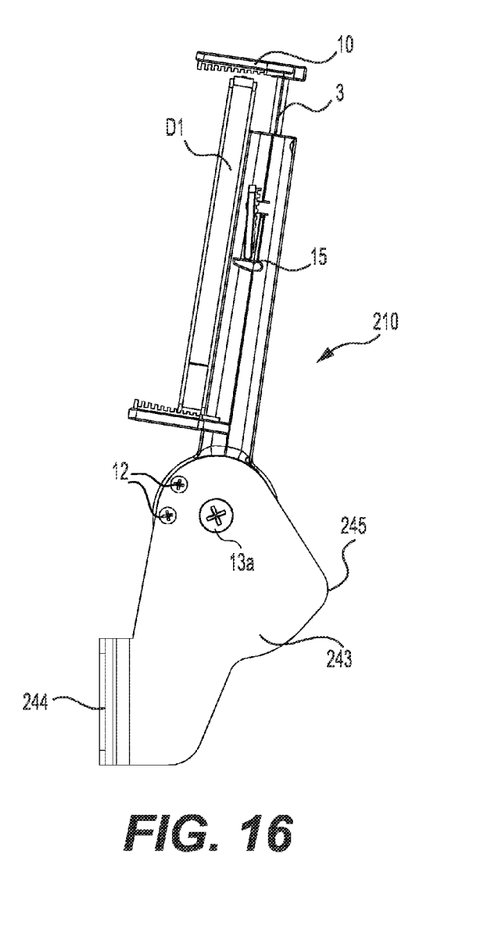
FIG. 16 shows a side elevational view of the mobile device holder holding the smartphone in the portrait position.
Figure 17:
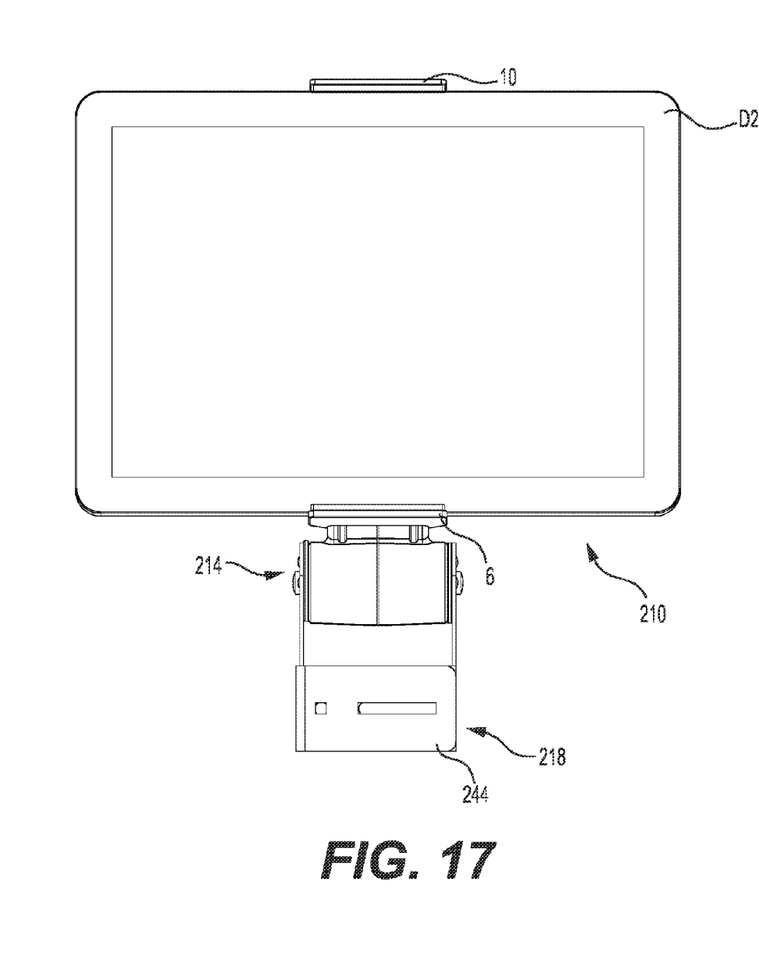
FIG. 17 shows a front elevational view of the mobile device holder holding a tablet device in a landscape position.
Figure 18:
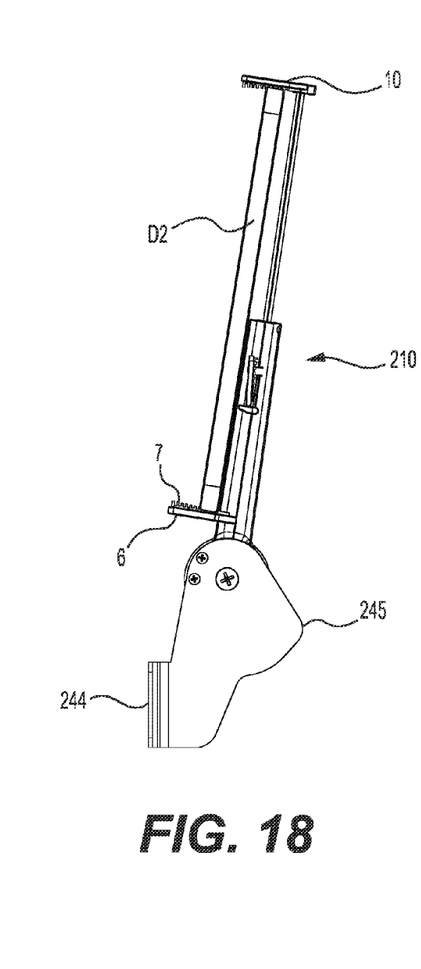
FIG. 18 shows a side elevational view of the mobile device holder holding the tablet device in the landscape position.

The mobile device holder 210 is configured to hold a mobile device. As shown in FIGS. 15-18, one way the mobile device holder can hold a mobile device is by removably clamping the mobile device D1, D2 between the upper shelf 10 and lower shelf 6, such that the upper shelf contacts one edge of the mobile device and the lower shelf contact another edge of the mobile device. In this way, the mobile device holder 210 can securely and removably hold mobile devices of varying widths or heights. As an example, FIGS. 15-16 show a smartphone D1 such as an iPhone being held by the mobile device holder 210 in an upright, or portrait, position, and FIGS. 17-18 show a tablet D2 such as an iPad being held by the mobile device holder. The lower shelf 6 may be provided with a pad 7 to contact a side of the mobile device and similarly, the upper shelf 10 may be provided with a pad 11 to contact an opposite side of the mobile device. The pads 7, 9, 11 may each be a soft covering in order to avoid scratching of mobile device D1, D2, and/or may be elastomeric to prevent displacement of the mobile device from the holder 212. Further, each pad 7, 9, 11 may have a thickness which decreases in a depth direction (i.e., a direction Y shown in FIG. 14) of the respective shelf on which it is mounted.

According to a feature of the disclosure, also provided may be a flip shelf 8 pivotably attached to the holding portion body 22 on opposite sides thereof. As shown in the Figures, the flip shelf 8 may include a pair of flip shelves independently pivotable or pivotable together via a flip shelf shaft 8a, or may include a single shelf extending the width of the holding portion body 22.

Figure 13:
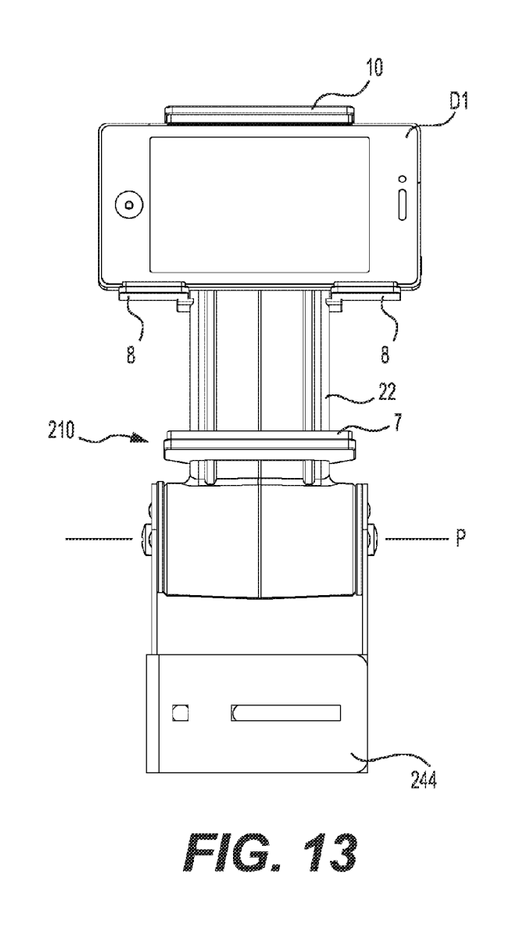
FIG. 13 shows a front elevational view of the mobile device holder holding a smartphone in a landscape position.
Figure 14:
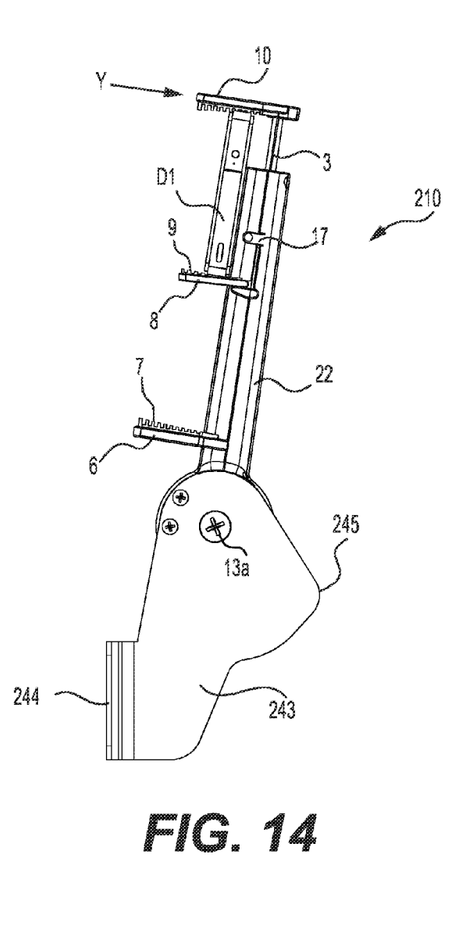
FIG. 14 shows a side elevational view of the mobile device holder holding the smartphone in the landscape position.

When the mobile device holder 210 it to hold a mobile device having a height or width less than the distance between the upper shelf 10 and the lower shelf 6 when the upper and lower shelves are nearest each other, the flip shelf 8 may be flipped down into a holding position so that the downwardly-biased upper shelf contacts one edge of the mobile device D1 and the flip shelf 8 contacts another edge of the mobile device to securely and removably hold the mobile device between the upper and flip shelves, as shown in FIGS. 13-14. FIGS. 2, 4, 5, 6A, 6B, 13 and 14 show the mobile device holder with the flip shelf 8 in the holding position, and FIGS. 1, 7A. 7B, 8A, 8B, 9, 10A, 10B, 11, 12A, 12B and 15-18 show the mobile device holder with the flip shelf in a stowed position.

Figure 6A:
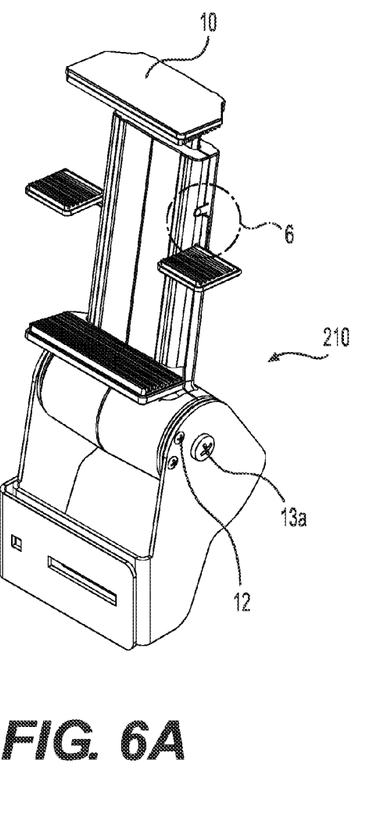
FIG. 6A shows a perspective view of the mobile device holder with the flip shelf in the holding position.
Figure 6B:
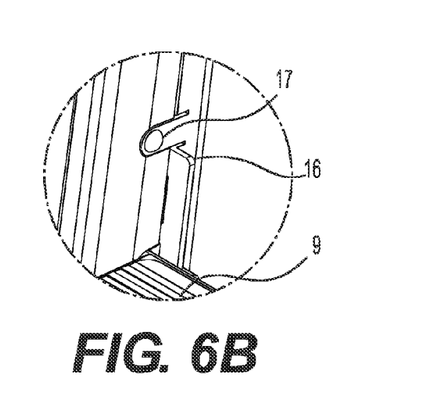
FIG. 6B shows enlarged area B of FIG. 6A.
Figure 7A:
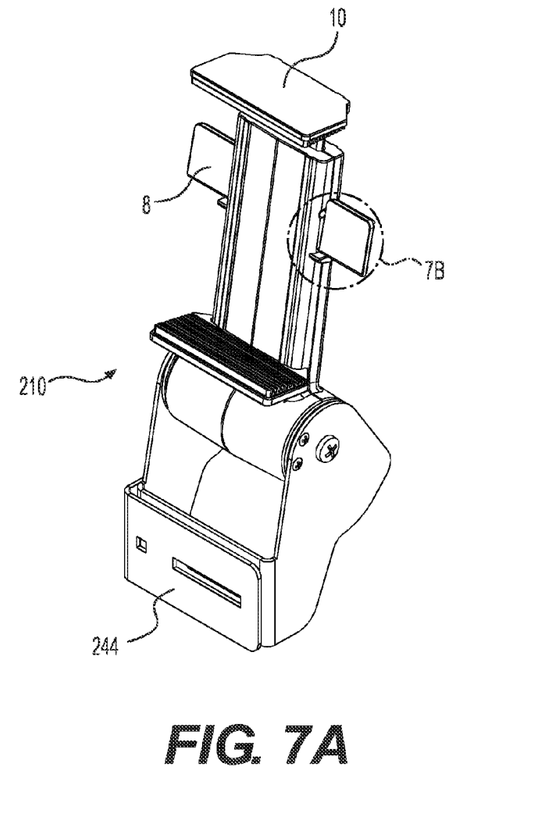
FIG. 7A shows a perspective view of the mobile device holder with the flip shelf in the stowed position.
Figure 7B:
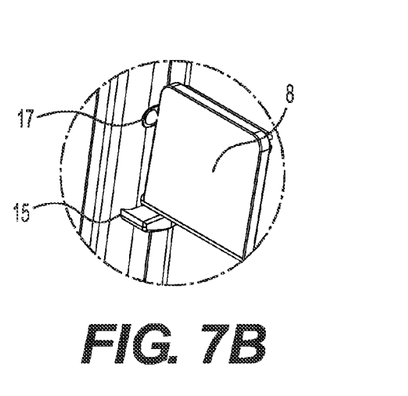
FIG. 7B shows enlarged area C of FIG. 7A.
Figure 8A:
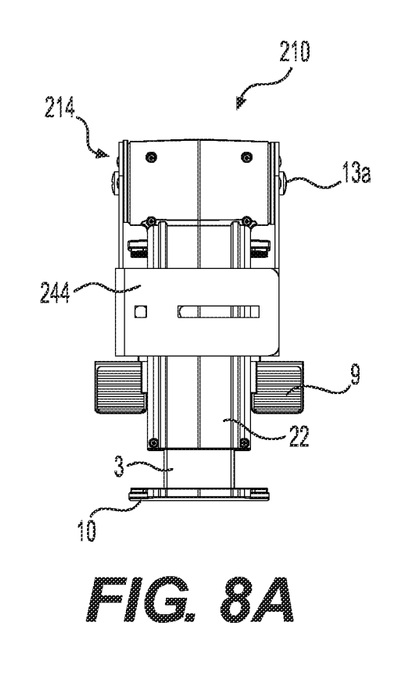
FIG. 8A shows a front elevational view of the mobile device holder in a stowed position.
Figure 8B:
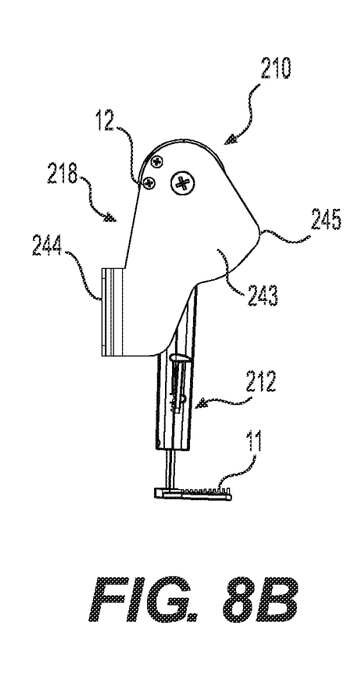
FIG. 8B shows a side elevational view of the mobile device holder in the stowed position.
Figure 8C:
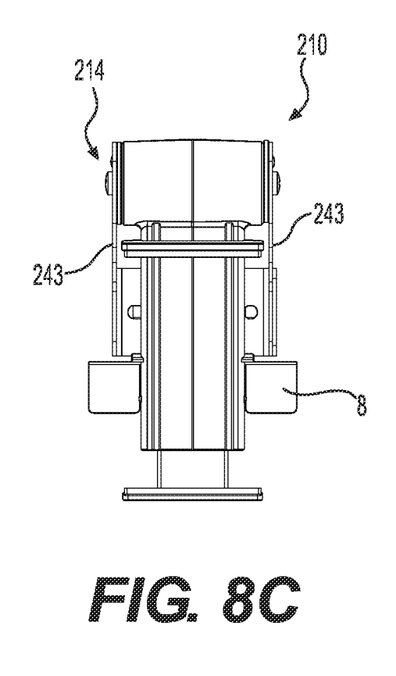
FIG. 8C shows a rear elevational view of the mobile device holder in the stowed position.
Figure 9:
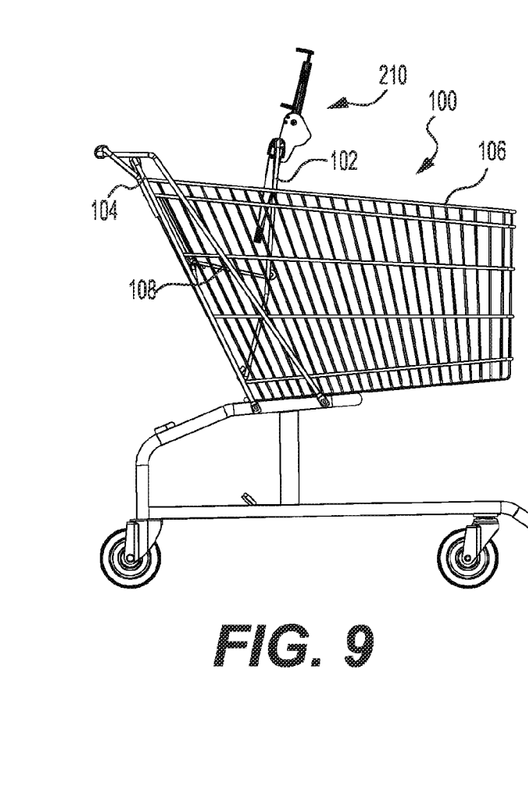
FIG. 9 shows a side elevational view of the mobile device holder in an upright position and affixed to a shopping cart.
Figure 10A:
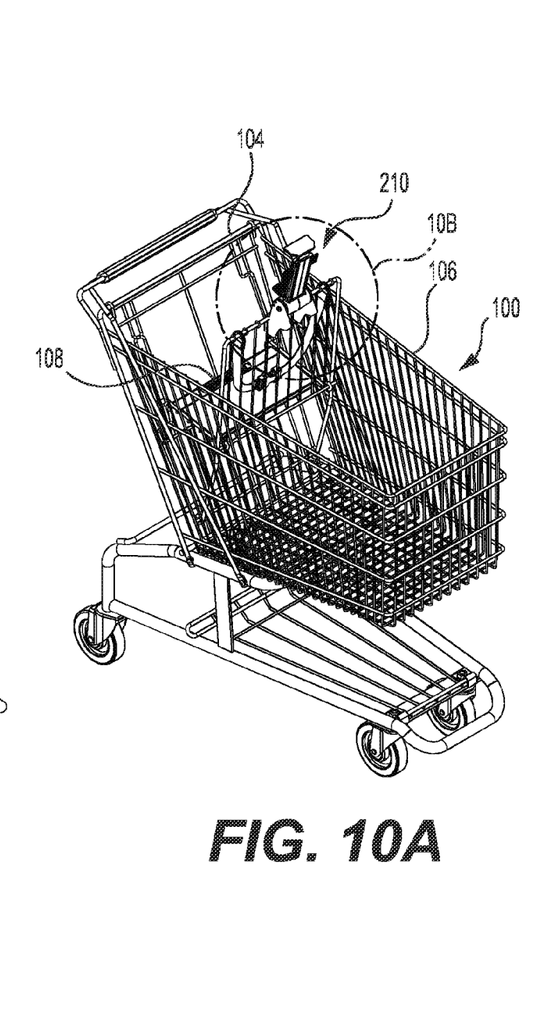
FIG. 10A shows a perspective view of the mobile device holder in the upright position and affixed to the shopping cart.
Figure 10B:
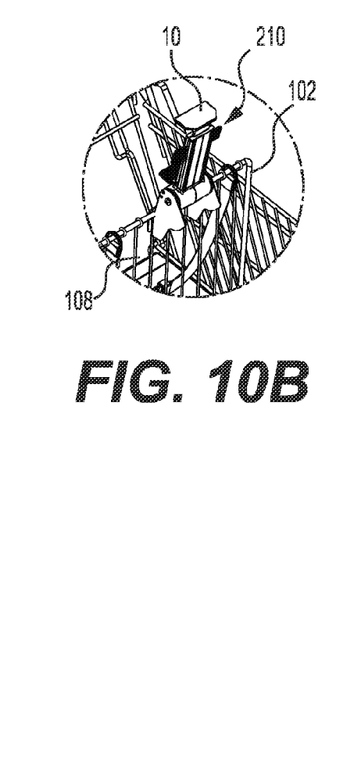
FIG. 10B shows enlarged area F of FIG. 10A.
Figure 11:
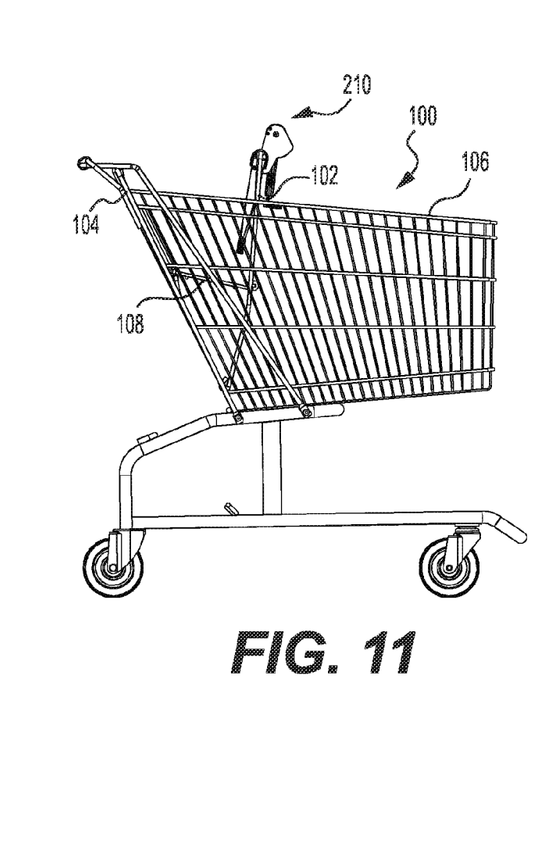
FIG. 11 shows a side elevational view of the mobile device holder in a stowed position and affixed to the shopping cart.
Figure 12A:
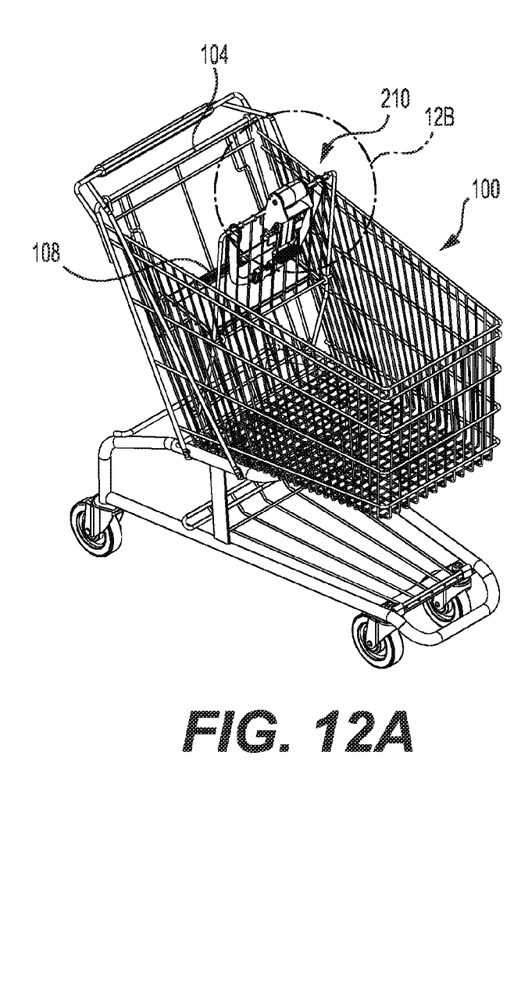
FIG. 12A shows a perspective view of the mobile device holder in the stowed position and affixed to the shopping cart.
Figure 12B:
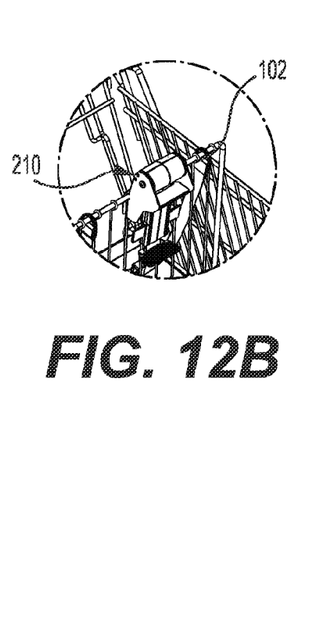
FIG. 12B shows enlarged area G of FIG. 12A.

As shown in FIGS. 7A-7B, a flip shelf support 15 located on either side of the holding portion body 22 prevents downward pivoting of the flip shelf 8 so that the flip shelf 8 is maintained in a plane generally parallel with the plane of the upper shelf 10 when the flip shelf is in the holding position (i.e., the flip shelf is prevented from pivoting outside of the range between the holding position and the stowed position, when the flip shelf is in the holding position). Further, as shown in FIGS. 2-3 and 6A-6B, a flip shelf stop 16 located on either side of the holding portion body 22 prevents backward pivoting of the flip shelf so that the rearmost position of the flip shelf 8 is in a plane generally parallel with the plane of the holding portion body when the flip shelf is in the stowed position. Also, as shown in FIGS. 6A-6B flip shelf lock 17 located on either side of the holding portion body 22 prevents unintentional forward pivoting of the flip shelf so that the flip shelf is maintained in the plane generally parallel with the plane of the holding portion body when the flip shelf is in the stowed position. The flip shelf lock 17 may be outwardly biased to contact an underside of the flip shelf 8 (best shown in FIG. 7B), when the flip shelf is in the stowed position. This way, the flip shelf does not interfere when a larger mobile device D2 or an upright/portrait mobile device D1 is held between the upper shelf 10 and lower shelf 6, as shown in FIGS. 15-18. Thus, the upper shelf 10 is biased downward such that when the flip shelf 8 is in the holding position, a smaller mobile device D1 is removably and securely held between the upper shelf 10 and the flip shelf 8 as shown in FIGS. 13-14, and such that when the flip shelf 8 is in the stowed position, a larger mobile device D2 (or a smaller mobile device in portrait orientation) is removably securely held between the upper shelf 10 and the lower shelf 6, as shown in FIGS. 15-18.

Figure 1:
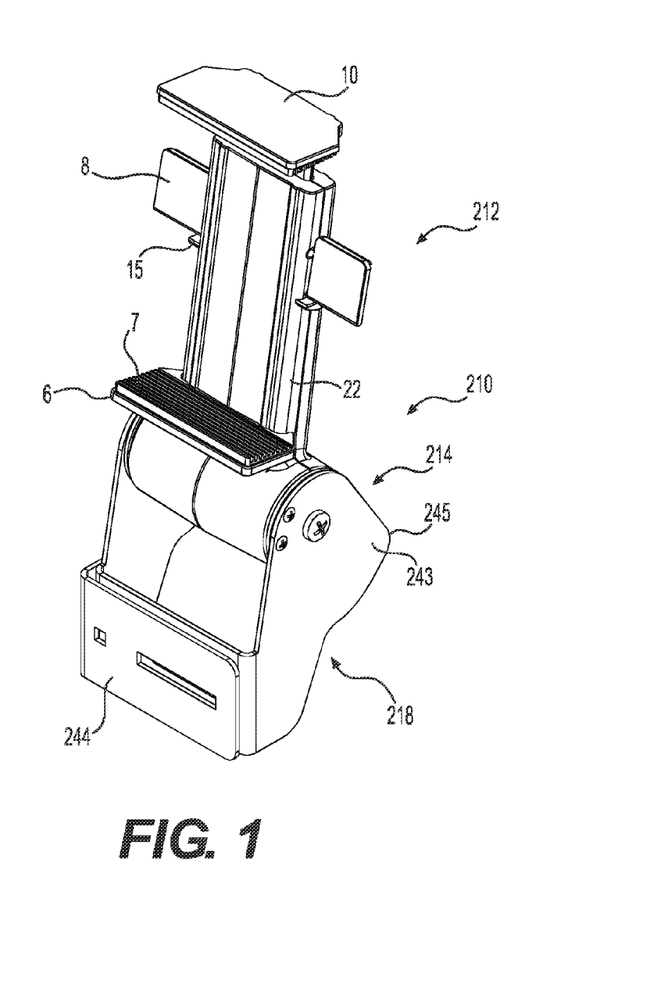
FIG. 1 shows a perspective view of a mobile device holder with a flip shelf in a stowed position, in accordance with an aspect of the disclosure.
Figure 2:
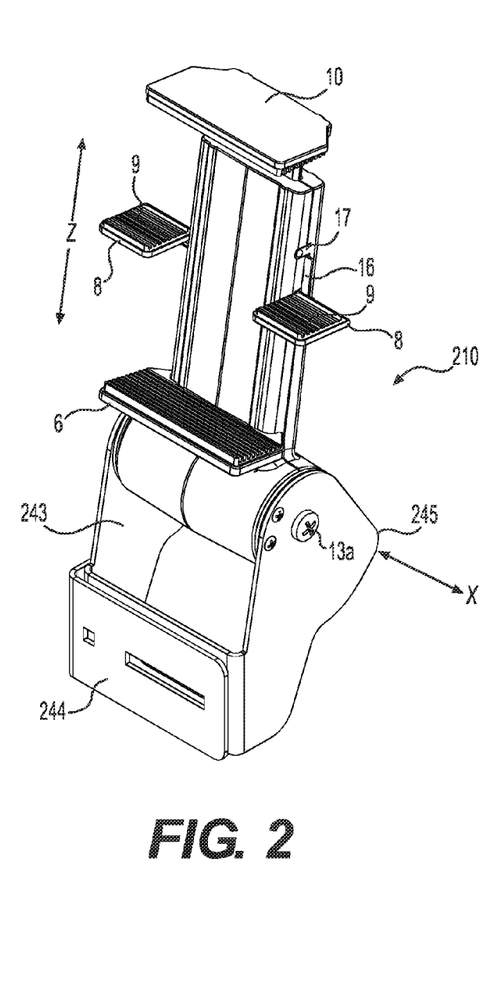
FIG. 2 shows a perspective view of the mobile device holder with a flip shelf in a holding position.
Figure 3:
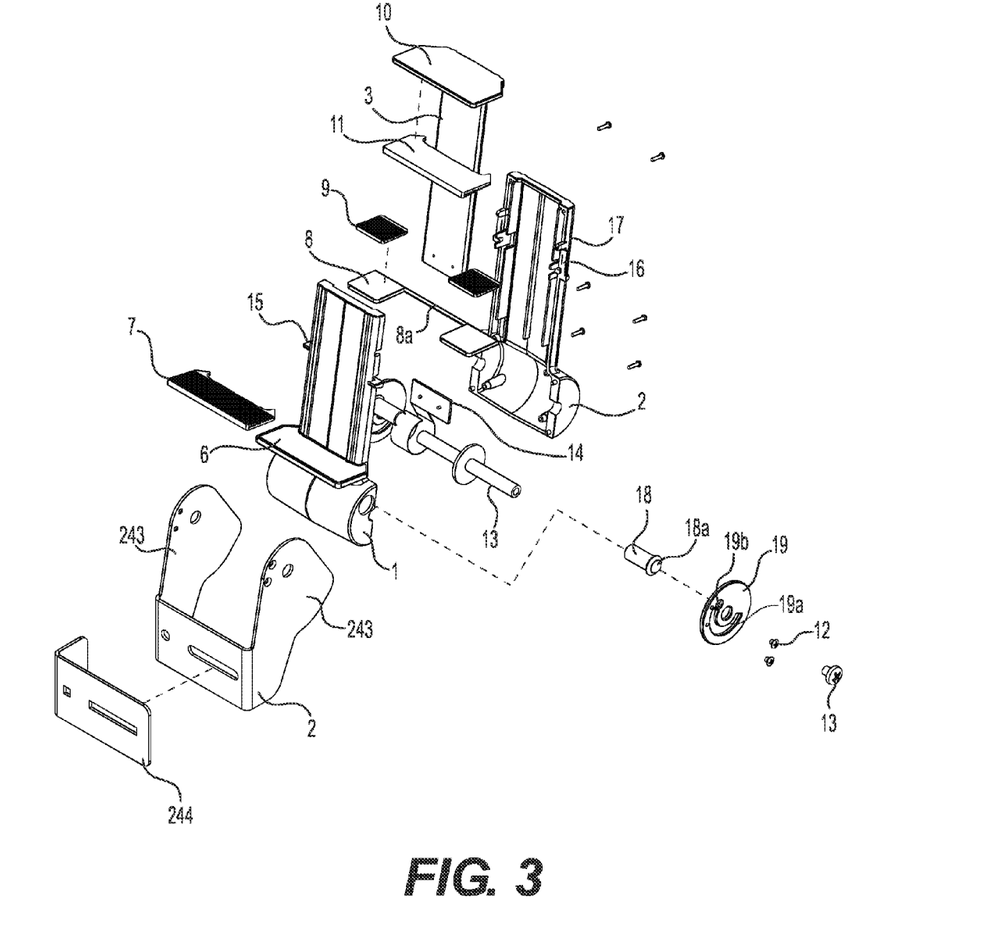
FIG. 3 shows an exploded view of the mobile device holder.
Figure 4:
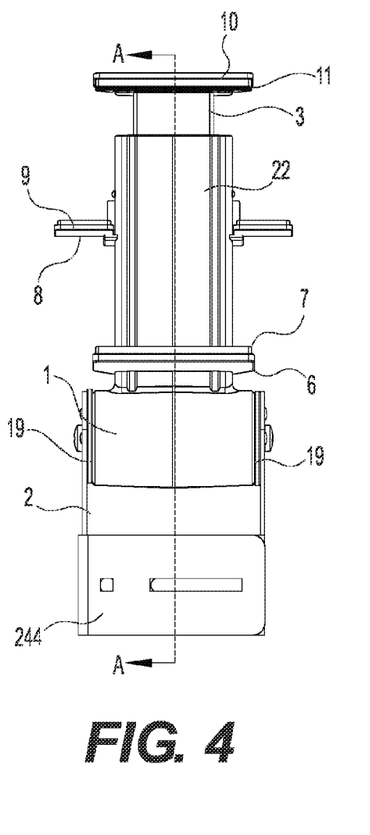
FIG. 4 shows a front elevational view of the mobile device holder.

The pivot assembly 214 is affixed to the base 218, and allows the housing portion 212 to pivot about a pivot axis P (extending in a direction generally parallel to axis X) between an upright position (shown in, e.g., FIGS. 1-2 and 13-18) and a stowed position (shown in FIGS. 8A-8C, 11 and 12A-12B). The base (or mount) 218 has a pair of arms 243 for rotatably supporting the pivot shaft 13 therebetween. As shown in FIG. 3, a pair of guide disks 19 is provided on opposite sides of the pivot shaft 13 to guide the pivoting motion and provide a pivoting range of the housing portion 212. The pivot assembly may be provided with a ball plunger 18 having an outwardly-biased spring-loaded ball 18a. During pivoting of the housing portion 212, the ball 18a is guided through a generally C-shaped channel and in the upright position the ball 18a is inserted into aperture 19a of guide disk 19. The housing portion 212 is maintained in the upright position until pressure is applied to the housing such that the ball 18a is pushed inwardly and the housing portion is allowed to rotate. This way, the housing portion 212 may be pivoted such that a screen of the mobile device may be oriented to a user's desired viewing angle, and inadvertent pivoting of the mobile device holder 210 (due to, e.g., shaking) is avoided. Further, by pivoting the housing portion downward to the stowed position, the mobile device holder avoids interfering with placement of items in the shopping cart. Mounting hardware 12 such as screws secure the guide disks 19 against rotation about axis P, and a center screw 13a or other suitable fastener is fitted into the pivot shaft 13 to secure the pivot shaft between the arms 243 of the mount 218.

As shown in, e.g., FIGS. 9-12B, the mobile device holder 210 is preferably attachable to a pivotable secondary basket 102 of a shopping cart 100. The secondary basket 102 of a shopping cart 100 is typically positioned in front of the end gate 104 and within the main basket 106. In the shopping art, a folding child seat 108 may be positioned between the secondary basket 102 and the end gate 104, such that the child seat may be folded when the secondary gate is pulled toward the cart pusher/shopper and against the end gate to make more room for items in the main basket 106. This arrangement also allows for the end gate 104, folding child seat 108 and secondary basket 102 to pivot together toward the front of the shopping cart 100 when another shopping cart is nested with the shopping cart. By mounting the mobile device holder 210 to the top of the secondary basket 102, nesting of the shopping carts is still possible, since the end gate 104, folding child seat 108 and secondary basket 102 pivot together, thereby conserving floor space. By mounting the mobile device holder 212 to the secondary basket 102, the mobile device D1, D2 is close enough to the user/shopper for easy viewing and/or easy engagement with a mobile device touch screen, whereas mounting a mobile device holder to a shopping cart handle could force the user/shopper to look down at an uncomfortable angle and/or take his/her eyes off the view ahead, and/or interfere with the nesting of shopping carts.

The mount 218 also includes a bumper 245 that protrudes toward the front of the shopping cart 100 (preferably beyond the other components of the device holder 210), in order to protect the other components of the device holder when shopping carts are pushed or banged together (e.g., during a cart nesting operation). The mount 218 can be mounted to the shopping cart 100 using a mounting bracket 244 secured by bolts or other methods of attachment such that the secondary basket 102 is sandwiched between the mount 218 and the mounting bracket. It is also understood by those of skill in the art that the mobile device holder 210 may be mounted to the shopping cart 100 by other methods than the mounting bracket 244 and bolts, including but not limited to a bayonet-type attachment, spring-loaded attachment, and the like. In an embodiment, the mounting bracket 244 is generally L-shaped (as shown) or U-shaped, in order to prevent sideways displacement of the mobile device holder 210. Alternatively, the mobile device holder 210 may be integrally formed with the secondary basket such that mounting hardware is not needed.

The mobile device holder 210 may be made of any suitable material rigid enough to hold a mobile device, including but not limited to plastic and metal. Further, while the embodiments described herein refer to the mobile device holder 210 attachable to a shopping cart 100, it is appreciated by those skilled in the art that the mobile device holder 210 is attachable to any structure which may be mobile or stationary, such as an automobile, bicycle, a stationary exercise machine, and the like.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients and the like used in the specification and claims are to be understood as being modified in all instances by the term "about." The terms "generally" and "approximately" as used herein are to be understood as an approximation allowing for variations while still maintaining the efficacy of the invention. Accordingly, unless indicated to the contrary, the numerical and geometric parameters and relationships set forth in the following specification and attached claims are approximations that may vary depending upon the desired properties sought to be obtained by the present invention. At the very least, and not as an attempt to limit the application of the doctrine of equivalents to the scope of the claims, each numerical and geometric parameters and relationship should be construed in light of the number of significant digits and ordinary rounding approaches.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A mobile device holder comprising:
 a holding portion body;
 a lower shelf fixedly attached to a base of the holding portion body and structured to support a mobile device;
 an upper shelf slidably affixed to the holding portion body and slidable along a plane defined by the holding portion body toward the lower shelf such that a distance between the upper shelf and lower shelf is adjustable;
 a pivot assembly connected to the holding portion body and structured to pivot about a pivot axis, wherein the lower shelf is attached to the base of the holding portion body at a fixed distance from the pivot assembly;

a flip shelf attached to the holding portion body between the upper shelf and lower shelf, the flip shelf pivotable relative to the holding portion body in a range between a holding position and a stowed position, wherein the holding portion body is structured to hold the mobile device between the flip shelf and the upper shelf, in the holding position; and a mount affixed to the pivot assembly, wherein the holding portion body, the upper shelf, the lower shelf, and the flip shelf are pivotable together about the pivot axis relative to the mount between an upright position and a stowed position.

2. The mobile device holder according to claim 1, wherein the holding portion body and lower shelf are integrally unitarily formed.

3. The mobile device holder according to claim 1, further comprising padding affixed to the upper shelf and the lower shelf and structured to contact the mobile device.

4. The mobile device holder according to claim 1, further comprising a spring structured to bias the upper shelf toward the lower shelf.

5. The mobile device holder according to claim 4, wherein the spring is a constant force tape spring.

6. The mobile device holder according to claim 1, wherein:
the mount comprises a pair of arms; and
the pivot assembly comprises a rotation shaft supported between the pair of arms and coincident with the pivot axis.

7. The mobile device holder according to claim 1, wherein each arm of the pair of arms comprises a protruding bumper extending in a direction opposite the lower shelf in the upright position.

8. The mobile device holder according to claim 1, wherein the flip shelf comprises a pair of flip shelves, each flip shelf of the pair of flip shelves attached to an opposite side of the holding portion body.

9. The mobile device holder according to claim 3, wherein a thickness of the padding decreases in a depth direction of the upper shelf and the lower shelf.

10. The mobile device holder according to claim 1, wherein the flip shelf is a single flip shelf.

11. The mobile device holder according to claim 1, further comprising a flip shelf lock affixed to a side of the holding portion body, the flip shelf lock structured to removably hold the flip shelf in the stowed position.

12. The mobile device holder according to claim 1, further comprising a flip shelf support structured to prevent pivoting of the flip shelf outside the range between the holding position and the stowed position, when the flip shelf is in the holding position.

13. The mobile device holder according to claim 1, further comprising padding affixed to the flip shelf and configured structured to contact the mobile device.

14. The mobile device holder according to claim 13, wherein a thickness of the padding decreases in a depth direction of the flip shelf.

15. The mobile device holder according to claim 1, further comprising a flip shelf stop structured to prevent pivoting of the flip shelf outside the range between the holding position and the stowed position, when the flip shelf is in the stowed position.

16. The mobile device holder according to claim 1, further comprising a slide guide affixed to the upper shelf and structured to slide along the housing to move the upper shelf towards and away from the lower shelf.

17. The mobile device holder according to claim 16, further comprising a spring, wherein one end of the spring is affixed to the slide guide and another end of the spring is affixed to the holding portion body such that the upper shelf is biased toward the lower shelf.

18. The mobile device holder according to claim 16, wherein:
the holding portion body comprises a front holding portion and a rear holding portion; and
the slide guide is structured to slide between the front holding portion and the rear holding portion.

19. A mobile device holder comprising:
a holding portion body;
a lower shelf affixed to a base of the holding portion body and configured structured to support a mobile device;
an upper shelf slidably affixed to the holding portion body and slidable along a plane defined by the holding portion body toward the lower shelf such that a distance between the upper shelf and lower shelf is adjustable;
a flip shelf attached to the holding portion body between the upper shelf and lower shelf, the flip shelf structured to pivot relative to the holding portion body in a range between a holding position and a stowed position, wherein the holding portion body is structured to hold the mobile device between the flip shelf and the upper shelf, in the holding position; and
a mounting assembly affixed to the holding portion body, wherein the lower shelf is attached to the base of the holding portion body at a fixed distance from the mounting assembly.

20. The mobile device holder according to claim 19, wherein:
the mounting assembly further comprises a pivot assembly pivotable about a pivot axis; and
the holding portion body, the upper shelf and the lower shelf are pivotable together about the pivot axis relative to the mount between an upright position and a stowed position.

* * * * *

UNITED STATES PATENT AND TRADEMARK OFFICE
CERTIFICATE OF CORRECTION

PATENT NO. : 9,126,615 B2
APPLICATION NO. : 14/208943
DATED : September 8, 2015
INVENTOR(S) : R. Mersky et al.

It is certified that error appears in the above-identified patent and that said Letters Patent is hereby corrected as shown below:

In the Claims

Column 9, lines 52, 53 (claim 13, lines 2, 3) please change "and configured structured" to -- and structured --

Column 10, line 28 (claim 19, line 4) please change "and configured structured" to -- and structured --

Signed and Sealed this
Fifth Day of July, 2016

Michelle K. Lee
*Director of the United States Patent and Trademark Office*